May 16, 1967     O. K. HOBBS     3,319,720
PEANUT DIGGER
Filed Aug. 24, 1964     2 Sheets-Sheet 1
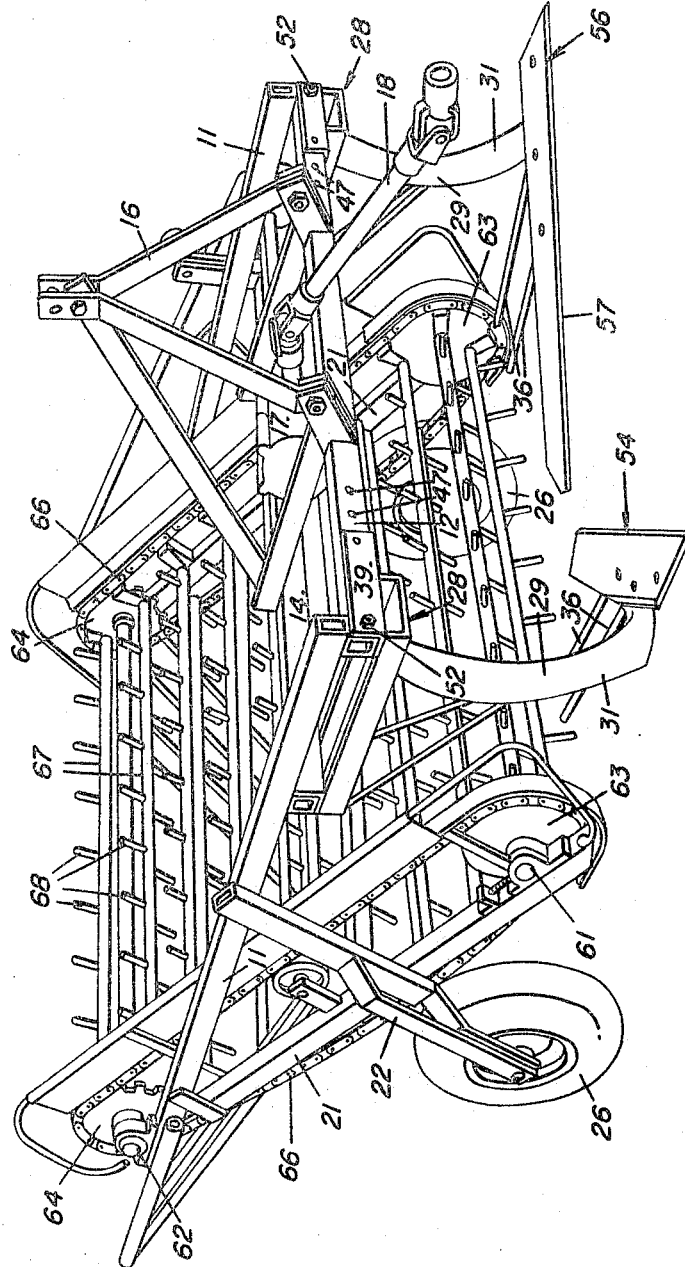
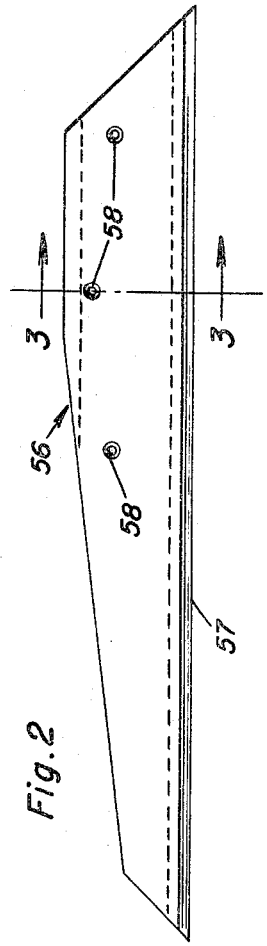
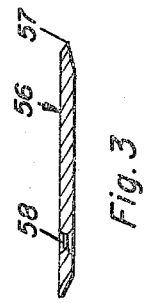
INVENTOR
*Oliver K. Hobbs*
BY
ATTORNEY

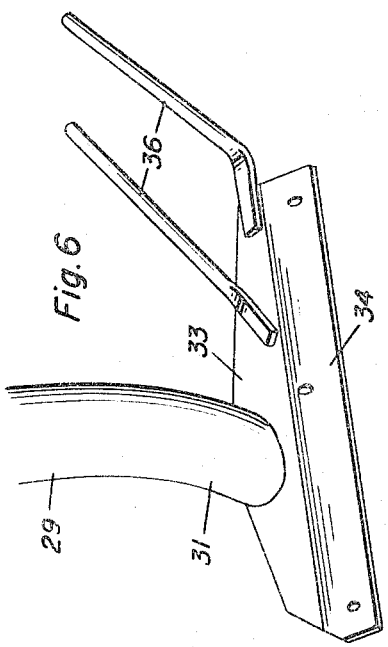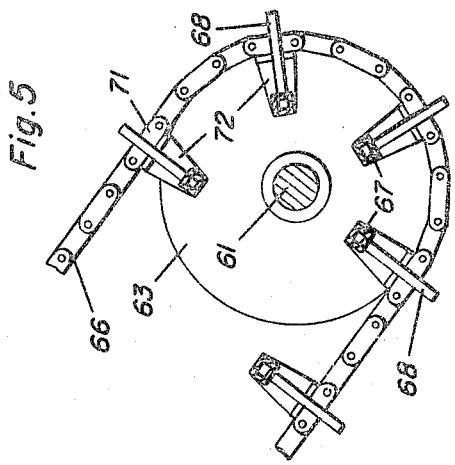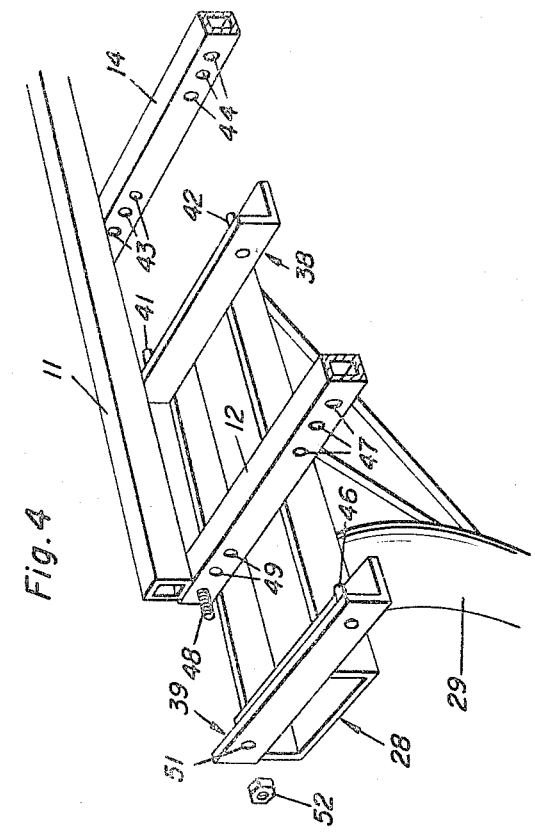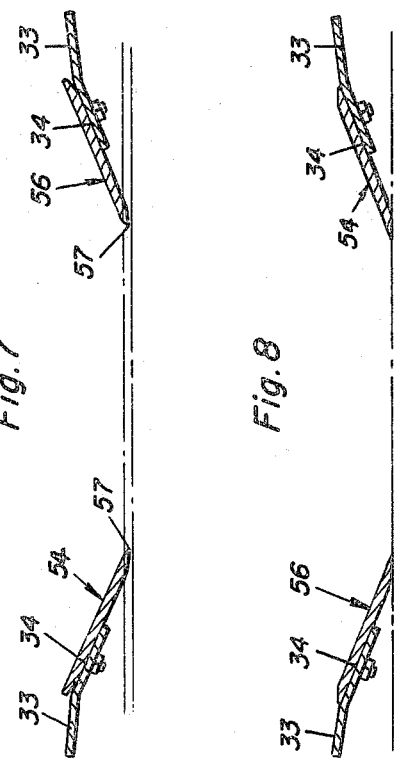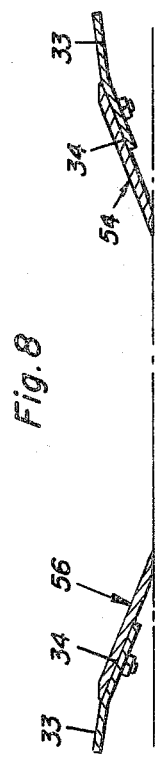
INVENTOR
Oliver K. Hobbs

United States Patent Office 3,319,720
Patented May 16, 1967

3,319,720
PEANUT DIGGER
Oliver K. Hobbs, P.O. Box 1306, Suffolk, Va. 23434
Filed Aug. 24, 1964, Ser. No. 391,500
4 Claims. (Cl. 171—101)

The present invention pertains to apparatus for removing peanuts which have vines that grow above the surface of the soil with the nuts attached to the vines beneath the surface of the soil and the invention pertains to apparatus for uncovering and lifting the nuts and the root portions of the vines and conveying the vines with nuts thereon to an elevated position to promote separation of the earth from the nuts and vines and to deposit the vegetation in a windrow. The invention more specifically relates to improvements in the ploy assemblies and a conveyor mechanism which functions to gently lift the vines with the peanuts attached and to spread such vegetation over the conveyor mechanism to facilitate removal of the soil and avoid separation of the nuts from the vines.

An object of the invention is to provide plow assemblies which serve to minimize accumulation of vegetation or soil thereon and to provide improvements in the structural relationship of the vine lifters and plows so that the vines and peanuts are lifted with the least possible agitation to avoid separation of the peanuts from the vines and to provide plow assemblies which are devoid of projections and cavities into which the vines and other materials may accumulate to promote the free flow of the roots with the peanuts attached to a position above the surface of the soil.

Another object of the invention is to provide means supporting the plows on the frame of a peanut digger in such a manner that they may be readily mounted on the frame and readily removed therefrom so that the conveyor mechanism of the machine may be conveniently converted for use in shaking a previously developed windrow of vegetation.

A further object of the invention is to provide structure providing for the mounting of the plow assemblies on the frame of the apparatus so that the position of the plows may be readily altered to adapt the digger to different widths of the rows of the peanuts.

Another object of the invention is to provide improvements in the structure which serves to elevate the vines with the peanuts attached after they have been removed from the soil whereby the vines and peanuts are gently picked up to reduce the tendency of the nuts to become separated from the vines and to provide for uniform distribution of the vegetation over the conveyor mechanism to provide for improved seperation of the soil from the vegetation and to provide for uniform discharge of the vines and the attached nuts in a windrow.

Other objects and features of the invention will be appreciated and become apparent as the present disclosure proceeds and upon consideration of the following detailed description taken in conjunction with the annexed drawings wherein an embodiment of the invention is disclosed.

In the drawings:

FIG. 1 is a perspective view of a peanut digger embodying the invention.

FIG. 2 is an enlarged plan view of one of the plow shares.

FIG. 3 is a sectional view taken on the line 3—3 of FIG. 2.

FIG. 4 is an exploded perspective view illustrating structure for mounting one of the plow assemblies on the frame of the apparatus.

FIG. 5 is a fragmentary transverse section of the pickup portion of the conveyor mechanism.

FIG. 6 is a front elevational view of a frog structure forming a part of the plow assembly shown at the left in FIG. 1.

FIGS. 7 and 8 are sectional views illustrating the manner in which the plow shares may be transposed.

The invention is directed to apparatus for carrying out a first step in the harvesting of peanuts and pertains to a peanut digger adapted to handle two rows of peanuts with the plow assemblies designed to sever roots of the peanut vines after which the vines with the peanuts attached are lifted from the soil and delivered to the pickup end of an endless conveyor mechanism which carries the vines and peanuts upwardly to seperate the soil therefrom and the vines and nuts free of soil are delivered over the discharge end of the conveyor and are guided as they move downwardly therefrom and deposited as a windrow.

Referring to the drawings the apparatus comprises a frame formed of side rails 11 connected at their forward ends by transverse elements 12 and 14 which may be secured to the side rails in any suitable manner such as by welding. The transverse elements 12 and 14 provide a rigid frame structure at the forward portion of the machine for the attachment of a tractor hitch indicated generally at 16 and serve to provide for the support of plow assemblies as hereinafter described. The transverse elements 12 and 14 also provide support for a gear box 17 which functions to transmit rotary movement from a power take-off shaft 18 to belts and pulleys (not shown) for driving the conveyor mechanism. Angularly disposed frame members 21 are attached to the side rails 11 providing support for bearings of the conveyor mechanism. Struts 22 attached to the side rails 11 and the frame mebers 21 accommodate mountings for gauge wheels 26 which support the apparatus for rolling movement.

The apparatus includes two plow assemblies which are attached to the frame in a unique manner so that they may be readily mounted thereon and detached therefrom whereby the horizontal spacing between the plow assemblies may be readily adjusted to adapt the digger to various row widths. Each plow assembly includes a sub-frame 28 (FIG. 4) attached to the upper end of a depending stem 29. The stem 29 may be formed of tubular stock and has a circular exterior surface. Each stem 29 depends generally vertically from its sub-frame 28 but the lower end portion is of arcuate formation as shown at 31 in FIG. 1 and projects forwardly with respect to the direction of movement of the apparatus. Such a construction of the stems 29 provide for a minimum of friction with the soil and avoids projections and cavities into which the soil or small roots may enter or attach themselves in the operation of the peanut digger. A frog structure 33 (FIG. 6) is attached to the lower end of each stem 29 in any suitable manner such as by welding. The frog 33 carries a surface 34 arranged in a single plane and disposed at an acute angle with respect to a horizontal plane.

Each frog 33 carries a plurality of tines 36 which extend rearwardly and upwardly from the associated frog structure. The upper surfaces of the tines 36 in the vicinity of the trailing edge of each plow share are substantially flush with the upper surface of the associated share providing assemblies which are devoid of notches and cavities into which vegetation, soil, peanuts and the like may be accommodated while the plow shares are operated under the surface of the soil for lifting the peanuts and the roots in a digging operation. Those portions of the tines 36 rearwardly of the trailing edges of the plow shares are inclined upwardly at varying angles to lift the vines with the peanuts thereon into the presence of the pickup of the conveyor mechanism.

Each sub-frame 28 is equipped with two angle bars 38 and 39 having a vertically extending flange and a horizontally disposed flange as best shown in FIG. 4. The vertically extending flange of the bar 38 is equipped with two horizontally disposed rearwardly extending pins 41 and 42. The pin 41 is adapted to be accommodated in any one of groups of spaced holes 43 provided in the transverse frame element 14. The pin 42 is adapted to be accommodated in any one of a group of holes 44 in the frame element 14. A horizontally disposed pin 46 carried by the vertical flange of the bar 39 is adapted to be accommodated in any one of a group of holes 47 in the transverse frame element 12. The horizontal flange of the bar 38 fits under the frame element 14 when the pins 41 and 42 are in the respective holes 43 and 44. The horizontal flange of the bar 39 fits the undersurface of the frame element 12. The vertical flanges of the bars 38 and 39 are then disposed along and in abutting relationship with the forward vertical surfaces of the frame elements 12 and 14. A bolt 48 arranged in any one of the holes 49 is adapted to extend through an opening 51 provided in the vertical flange of the bar 39. A nut 52 threaded on the bolt 48 serves to maintain the pins in the openings in the frame elements and avoids unintended detachment of the plow assemblies from the frame.

The plow assemblies may be readily mounted on and detached from the frame by an unskilled individual. The positions of the plow assemblies may be adjusted transversely of the frame to adapt the digger to different widths of rows of peanuts. The plow assemblies may be readily detached simply by removing the nuts 52 after which the plow assemblies may be moved forwardly relative to the main frame.

A feature of the plow assemblies pertains to the shape and mounting of the plow shares 54 and 56 on the respective frogs. These plow shares are formed of flat steel stock and they are of elongated shape. The forward cutting edge 57 of the share 56 and shown at the right in FIG. 1 is sharpened as shown in FIGS. 3 and 7. When this forward edge is worn the share 56 may be removed and inverted and mounted on the frog shown at the left in FIG. 8 after the share 54 has been removed. The share 54 may then be mounted on the frog at the right side of FIG. 8. It is for this purpose that the holes 58 in the plow shares are counter-sunk at both faces of each share as shown in FIGS. 1 and 3.

The conveyor mechanism includes a shaft 61 journalled for rotation in bearings carried by the forward ends of the frame members 21. Another shaft 62 at the discharge end of the conveyor is supported for rotation by bearings carried by the upper end portions of the frame members 21. A pair of sprocket wheels 63 are mounted on the shaft 61 and a pair of sprocket wheels 64 are carried by the shaft 62. The shaft 62 is driven by a belt and pulley transmission mechanism (not shown) to which power is delivered from the gear box 17. A sprocket chain 66 is trained about the sprocket wheels 63 and 64 of each side of the apparatus. Transversely extending bars 67 each carrying vine engaging teeth or tines 68 extend transversely between the sprocket chains 66. Some of the links of each sprocket chain are formed as L-shaped members 71 and a bracket 72 is pivotally attached to each member 71. The ends of the bars 67 are secured to the respective brackets 72. This mounting of the ends of the bars 67 provides that they are disposed inwardly of the path of movements of the sprocket chains 66 as will be apparent from a consideration of FIGS. 1 and 5.

Thus when the bars 67 pass about the sprocket wheels 63 at the pickup end of the conveyor they move at a slower rate of movement rather than being accelerated as would be the case if the bars were disposed outside the path of movement of the chains 66. The bars 67 of the conveyor are disposed inwardly of the periphery of the sprocket wheels 64 as they turn about the discharge end of the conveyor. The movement of the bars 67 about the discharge end is at a slower rate than would be the case if the bars were disposed outside the path of movements of the conveyor chain. The bars slow down as they move through the arcuate paths at the delivery and discharge zones. This provides that less peanuts are stripped from the vines in the pickup zone. There is less tendency of the bars to twist and wear of the conveyor mechanism is reduced. The slower movement of the conveyor in the pickup zone allows the vines to be spread over the conveyor in a thinner layer to promote separation of soil from the vegetation.

While the invention has been described with regard to one type of apparatus and one general assembly of a peanut digger it will be appreciated that changes may be made in the various elements along with the general organization. Such modifications and others may be made without departing from the spirit and scope of the invention as set forth in the appended claims.

What I claim and desire to secure by Letters Patent is:

1. In a peanut digger, a main frame having longitudinally extending side rails, a first element disposed transversely of said side rails and forming a part of the main frame, a second element disposed transversely of said side rails spaced rearwardly of the first element and forming a part of the main frame, a plow and sub-frame assembly subject to twisting action in a peanut digging operation, a first elongated bar forming a part of said sub-frame having a vertical flange throughout the length of the first bar abutting a front face of said second element and having a horizontal flange throughout the length of the first bar fitting under said second element, a second elongated bar forming a part of said sub-frame having a vertical flange throughout the length of the second bar abutting a front face of the first element and a horizontal flange throughout the length of the second bar fitting under the first element, a pin carried by the vertical flange of the first bar adjacent each end thereof with said pins extending rearwardly therefrom, said second element having spaced holes receiving said pins, a pin carried by the vertical flange of the second bar near one end thereof and extending rearwardly therefrom, said first element having holes therein for receiving the pin on the second bar, a threaded bolt extending forwardly from the first element, the vertical flange of the second bar having an opening therein near the other end thereof accommodating said bolt, and a nut threaded on said bolt detachably holding the vertical flanges along the front faces of said elements.

2. In a peanut digger, a main frame having longitudinally extending side rails adapted for movement in a forward direction during a peanut digging operation, a first element disposed transversely of the side rails forming a part of the main frame, a second element disposed transversely of the side rails and spaced rearwardly of the first element forming a part of the main frame, a plow and sub-frame assembly subject to twisting action in said peanut digging operation, a first bar forming a part of said sub-frame having a vertical flange abutting a front face of said second element and having a horizontal flange extending under said second element, a second bar forming a part of said sub-frame having a vertical flange abutting a front face of the first element and a horizontal flange extending under the first element, horizontally spaced pins carried by the vertical flange of the first bar extending rearwardly therefrom, said second element having holes accommodating said pins, a pin carried by the vertical flange of the second bar extending rearwardly therefrom, said first element having holes therein receiving the pin on the second bar, a bolt extending forwardly from said first element through an opening in the vertical flange of the second bar, and a nut threaded on said bolt detachably holding the vertical flanges adjacent the front faces of said elements.

3. In a peanut digger, a frame, plow assemblies mounted on and depending from a forward portion of said frame, a horiznotally disposed shaft journalled for rotation at a forward portion of the frame adjacent but spaced rearwardly of said plow assemblies, horizonally spaced sprocket wheels on said shaft, a second horizontally disposed shaft journalled for rotation on a rear and elevated portion of said frame, horizontally spaced sprocket wheels on said second shaft, a first sprocket chain at one side of said frame trained about two of said sprocket wheels with the chain movable in a loop-shaped path generally in the plane of its sprocket wheels, a second sprocket chain at the other side of the frame trained about the other sprocket wheels with the second chain movable in a loop-shaped path generally in the plane of its sprocket wheels, bracket means fixed to the first sprocket chain at spaced intervals therealong extending towards the second sprocket chain and having an end portion disposed to move in a loop-shaped path circumscribed by the first loop-shaped path, bracket means fixed to the second sprocket chain at substantially equally spaced intervals therealong extending towards the first sprocket chain and having an end portion disposed to move in a loop-shaped path circumscribed by the loop-shaped path of the second sprocket chain, a plurality of substantially straight bars extending transversely of the frame with the ends of each bar rigidly attached respectfully to end portions of said bracket means whereby each bar moves with said sprocket chains with the bars maintained in non-rotatable relationship with respect to the sprocket chains as they move about said sprocket wheels and a plurality of tints carried by each bar at spaced intervals along the length thereof projecting from the associated bar with a minor portion of each tine projecting outside the paths of movement of said sprocket chains.

4. In a peanut digger, a frame, a first stem depending from the frame and a first frog carried by the lower end thereof, a second stem depending from said frame laterally of the first stem and a second frog carried by the lower end of the second stem, a first elongated plate shaped plow share having a substantially straight forward edge, a beveled upper surface on said plate at the forward edge providing a cutting edge, said plate having a plurality of holes therethrough adjacent the outer end thereof counter-sunk at both faces of the plate, a rear edge on said plate converging towards its forward edge in proceeding towards the other end thereof so that the inner end portion of the plate has less width than the outer end portion, bolts extending through said holes and said first frog detachably securing the first plow share to the first frog, a second elongated plate shaped plow share having a substantially straight forward edge, a beveled upper surface on said second plate at the forward edge providing a cutting edge, said second plate having a plurality of holes therethrough adjacent the outer end thereof counter-sunk at both faces of the second plate, a rear edge on said second plate converging towards its forward edge in proceeding towards the outer end thereof so that the inner end portion of the second plate has less width than the outer end portion, bolts extending through the holes in the second plate and said second frog detachably securing it to the second frog, said first plow share being detachable from the first frog so that it may be turned end for end and mounted in an inverted position on the second frog, and said second plow share being detachable from the second frog so that it may be turned end for end and mounted in an inverted position on the first frog whereby the beveled surfaces on said plates are disposed downwardly.

References Cited by the Examiner
UNITED STATES PATENTS

| | | | |
|---|---|---|---|
| 2,416,006 | 2/1917 | Howard et al. | 172—763 |
| 2,828,825 | 4/1958 | Johnson | 198—196 X |
| 2,952,321 | 9/1960 | Lyle et al. | 171—101 X |
| 2,999,547 | 9/1961 | Long | 171—101 |
| 3,091,299 | 5/1963 | Truelove | 172—762 |

ABRAHAM G. STONE, *Primary Examiner.*

ANTONIO F. GUIDA, *Examiner.*